June 29, 1971 C. T. NULL 3,589,986
METHOD OF FABRICATING A GLASS FORMING APPARATUS
Original Filed July 13, 1966
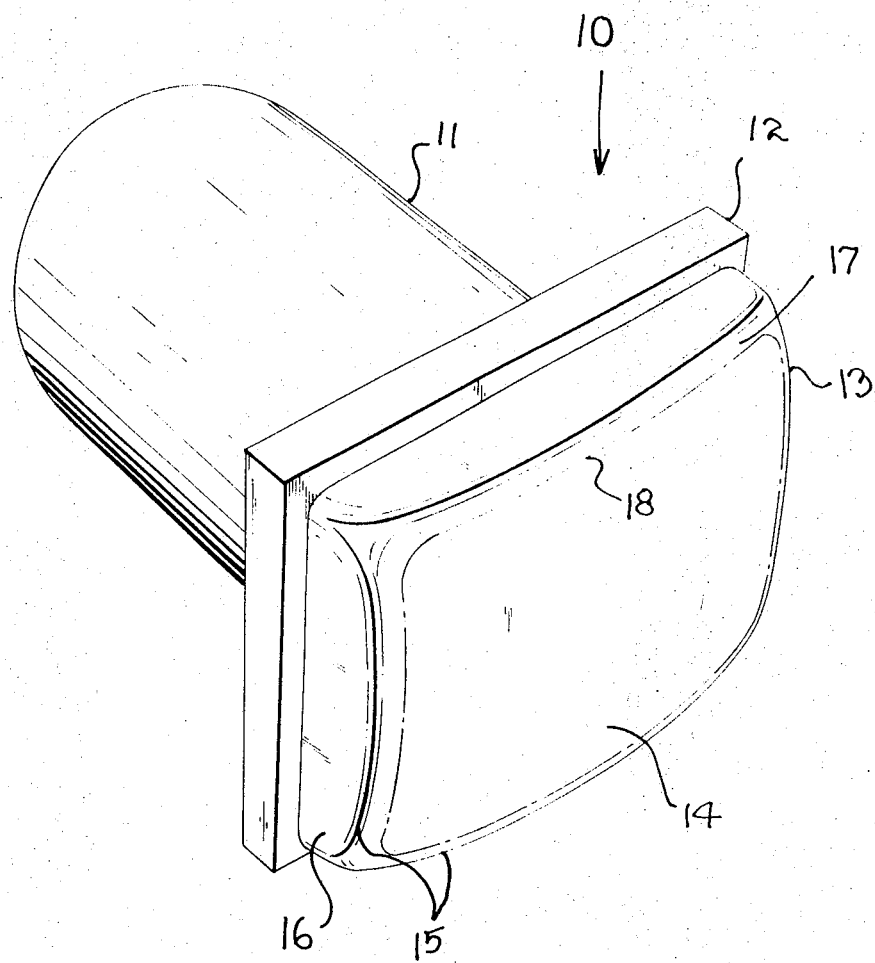
INVENTOR.
CARROLL THOMAS NULL
BY D. R. Birchall
C. J. Holler
ATTORNEYS

United States Patent Office 3,589,986
Patented June 29, 1971

---

3,589,986
METHOD OF FABRICATING A GLASS FORMING APPARATUS
Carroll Thomas Null, Columbus, Ohio, assignor to Owens-Illinois, Inc.
Original application July 13, 1966, Ser. No. 564,879. Divided and this application Apr. 28, 1969, Ser. No. 850,274
Int. Cl. C23b 5/48
U.S. Cl. 204—15                         3 Claims

ABSTRACT OF THE DISCLOSURE

Method of fabricating a plunger for the manufacture of pressed glass articles wherein the cleaned and roughened surface of the plunger is plated with chromium in such a manner that the chromium is deposited only on the edge and peripheral border area and the plated surface is then treated with an abrasive to produce a stippled effect thereon.

---

This is a division of patent application Ser. No. 564,879, filed July 13, 1966, and now abandoned.

This invention relates to apparatus useful in the production of pressed glassware and, more particularly, the present invention relates to a glass forming plunger and to the method of making a plunger.

In making glass articles, such as the face plates of television picture tubes and glass block halves which have a base and a flange extending around the periphery of the base and forming an angle with the base, a gob of molten glass is placed into a mold having an internal molding surface corresponding to the external configuration of the article that is to be formed and a plunger is moved downwardly to press and form the glass into the desired article. The plunger has an external molding surface corresponding to the internal configuration of the glass article that is to be formed. As the plunger moves into its final position adjacent the internal surface of the mold, the hot glass is forced from the gob configuration into a broad glass article whose thickness is relatively thin when compared to the overall lateral dimension of the article. In order for the glass to assume its final configuration, there must be considerable movement of the glass across the surfaces of the plunger and the mold.

One of the difficulties encountered during the production of articles such as television face plates has been a predominately red discoloration in certain areas of the finished article. The discoloration has been determined to be an interaction between the alloying constituents within the glass and the metals used in the plunger. The plungers are made from a variety of alloyed metals such as, for example, 420 stainless steel. Even though the name implies that the plunger metal is stainless, the plunger will after a period of continued use for three or more hours become coated with what appears to be a red oxide coating. An analysis of the objectionable coating has shown it to be quite complex. It is believed to be compounds including aluminum, oxygen, fluorine, calcium, sodium, silicon and iron. It is known that when the fluorine content is increased in a given glass, the discoloration problem on and within the glass is increased and that a decrease in fluorine will reduce the discoloration; however elimination of constituents such as fluorine is not practical since its presence in the glass controls the ease with which the glass can be worked.

The production of oxide on the surface of the plunger actually interacts with the glass thus producing a red discoloration throughout portions of the glass. In addition to producing a glass unacceptable within the television industry, the bottom surface is affected thus causing extensive rework and down time while the plunger is reprocessed because it no longer can comply with the stringent tolerances demanded of today's pressed glassware items such as television face plates.

It has been discovered that the red discoloration is glassware such as television face plates can be controlled by chromium plating the peripheral edges of the plunger including a band extending around the large flat face of the plunger. Chromium plating is applied only to the outer edge of the plunger and to a small band extending inward toward the center of the plunger. The small band of chromium plating has not heretofore been knowingly employed in plunger design and offers a distinct advantage over a plunger with no chromium plating and also a plunger that has been chromium plated in its entirety.

While the application of chromium plating to the entire surface of the plunger controls the discoloration in the glass article, the heat-softened gob of glass does not flow across a chromium surface in the desired manner as will be described in greater detail infra.

The primary object of the present invention is to treat a glassware forming plunger so that it will not discolor the glass during the pressing thereof.

Another object of this invention is to chromium plate a portion of the plunger utilized in the production of large flat glass articles.

A further object of the present invention is to provide an apparatus that will press a wide variety of sizes of television face plates for both monochromatic and polychromatic tube envelopes.

Another object of this invention is to provide a method of making a glass forming plunger that will have the plating thereon positioned only over a selected area.

Other objects and advantages of the invention will hereinafter be pointed out or will be obvious from the following description and the accompanying drawing in which:

In the drawing:

The single figure in the drawing represents a perspective view of a plunger assembly including its immediate support structure. The overall assembly is shown at 10. A head 11 is shown in cylindrical form and is that portion of the plunger assembly that attaches to a movable press (not shown). Cooling fluid lines are normally brought to and from the plunger through head 11, however they are not considered to be part of this invention. A mounting flange 12 is attached to head 11 and is used to support the plunger face 13. Plunger face 13 can be attached to flange 12 in any conventional manner such as bolts. Plunger face 13 has a broad relatively flat frontal surface 14 that is generally of convex configuration. Surrounding frontal surface 14 are edges 15. Edges 15 are well radiused and couple frontal surface 14 to sidewalls 16. Sidewalls 16 are generally slightly curved in the circumferential direction in plungers adapted for the production of rectangular television face plates and is of circular configuration in round cathode-ray tubes or television face plates. Sidewall or sidewalls 16 are also slightly tapered from front to rear so that the plunger can be readily extricated from the face plate after the press cycle is completed.

A layer of chromium plating is shown at 17. The plating extends over sidewalls 16 and forms a band around frontal surface 14. The interior edge 18 of chormium plating 17 extends inward from edge 15 approximately three inches in a plunger adapted for production of nineteen-inch television face plates. The exact or optimum distance that the chromium plating extends across frontal surface 14 will, of course, depend upon the configuration and size of face plate that is being produced.

In order to plate the plunger face 13, it is first submitted to an abrasive treatment employing an aqueous solution containing aluminum oxide or other suitable abrasive material. The cleaned plunger face is then placed into an electrolytic deplating tank for removal of extraneous metals and prior metallic plating. Subsequent to deplating, the plunger face is subjected to a sandblast operation to obtain the desired surface texture. After sandblasting, the plunger face is immersed into an electroplating bath so that chromium may be deposited thereon. By proper anode position, chromium is deposited only on sidewalls 16, edges 15, and a narrow band on frontal surface 14. The plunger face is immersed in the chromium electroplating bath for various time intervals depending upon the thickness of chromium that is desired. It has been found that fifteen minutes of plating time will produce an acceptable layer of chormium plating. Sinch chromium is generally deposited at the rate of 0.001 inch per hour, it would be logical to assume that fifteen minutes of electro-deposition would result in a thickness of 0.00025 inch. It would be within the scope of this invention to utilize even thinner layers of chromium, for example, 0.000125 inch. When the electro-deposition time is increased to an hour or more, the thickness of chromium is such that interior edge 18 begins to form a mark on the pressed glassware.

After the selective chromium plating has been deposited, the entire plunger face is sandblasted to produce a stippled surface thereon.

The significance of the present invention will be more fully realized through the following discussion. When an ordinary plunger is used in production, it may be kept in operation for periods that may be as short as three hours before it must be removed for replacement or cleaning. The phenomenon of producing so-called "red ware" can occur at any time. It is completely unpredictable consequently high reject quantities can be produced before it is detected. The chromium plating of the plunger, as heretofore set forth, practically eliminates the "production of red ware" and also increases the usable time span, without maintenance, of the plunger from three hours to approximately five hours. Additionally, it is sometimes possible to return a chromium plated plunger to the production line several times by merely cleaning it.

An additional fact that makes the present invention novel and unobvious resides in the fact that the strategically positioned chromium band as discussed supra is far superior to a plunger that is chromium plated in its entirety. It has been discovered that if the plunger is entirely plated, the gob of glass will not form in the proper manner. The glass will slide irradically across a chromium surface instead of flowing in the desired manner. When a plunger that has been chromium plated over its entire surface is used in the manufacture of television face plates, there will be an unevenness or contrast in the stipple imprinted on the interior of the face plate. The contrast in stipple can readily be observed in those portions where the glass actually slipped along the plunger surface. The areas where slippage occurred have a more glossy appearance than the stippled areas.

The stippled interior surface is beneficial in that a phosphor surface placed thereon will luminesce with a greater intensity than will the same phosphor coating when placed on a flat glass surface. The overall detrimental effect of stipple contrast will result in dark areas on the screen of a television receiver. By restricting the chromium to the exterior peripheral surfaces of the plunger according to the present invention, a television face plate can be created with an even stipple and also an absence of red streaks or sections on and within the glass itself.

The present invention has been described in terms of plating with chromium which is by no way intended to be a limitation on the scope of this invention. The invention conceivably would work equally well with additional plating metals or combinations thereof.

While certain representative embodiments and details have been shown for the purpose of illustrating the invention, it will be apparent to those skilled in this art that various changes and modifications may be made therein without departing from the spirit or scope of the invention.

What is claimed is:
1. The method of making a plunger having a relatively flat frontal area for the manufacture of pressed glass articles including the steps of:
    (1) removing extraneous materials from the surface of the plunger,
    (2) treating the surface of said plunger with an air carried abrasive to roughen and clean the surface prior to plating,
    (3) chromium plating a portion on the surface of said plunger by placing the anode around the article so that the chromium is deposited only on the edge and peripheral border area of said frontal area, and
    (4) treating the surface of said plunger with an abrasive to produce a stippled effect thereon.
2. The method as claimed in claim 1 wherein the plating has a thickness of at least 0.0001 inch.
3. The method as claimed in claim 2 wherein the plating has a thickness in the range of from 0.0001 to 0.002 inch.

References Cited
UNITED STATES PATENTS

| | | | |
|---|---|---|---|
| 2,151,686 | 3/1939 | Briefer | 117—8 |
| 2,212,984 | 8/1940 | Greed | 117—5.3X |
| 2,412,698 | 12/1946 | Van Der Horst | 29—527.2X |
| 3,070,982 | 1/1963 | McGowan | 117—5.3X |
| 3,347,650 | 10/1967 | Barkhau | 117—5.3X |

JOHN F. CAMPBELL, Primary Examiner

D. C. REILEY, Assistant Examiner

U.S. Cl. X.R.

29—527.2; 117—5.3, 8; 204—35